US012604320B2

(12) United States Patent
Lee et al.

(10) Patent No.: US 12,604,320 B2
(45) Date of Patent: *Apr. 14, 2026

(54) METHOD FOR TRANSMITTING CONTROL AND TRAINING SYMBOLS IN MULTI-USER WIRELESS COMMUNICATION SYSTEM

(71) Applicant: Electronics and Telecommunications Research Institute, Daejeon (KR)

(72) Inventors: Yu-Ro Lee, Daejeon (KR); Jung-Bo Son, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,456

(22) Filed: Dec. 22, 2023

(65) Prior Publication Data

US 2024/0137936 A1 Apr. 25, 2024

Related U.S. Application Data

(63) Continuation of application No. 17/314,067, filed on May 7, 2021, now Pat. No. 11,856,578, which is a
(Continued)

(30) Foreign Application Priority Data

Oct. 30, 2009 (KR) ........................ 10-2009-0104616
Feb. 12, 2010 (KR) ........................ 10-2010-0013612

(51) Int. Cl.
H04W 72/20 (2023.01)
H04B 7/0452 (2017.01)
(Continued)

(52) U.S. Cl.
CPC .......... *H04W 72/20* (2023.01); *H04B 7/0452* (2013.01); *H04L 1/007* (2013.01);
(Continued)

(58) Field of Classification Search
CPC .......................... H04W 84/12; H04L 27/2613
See application file for complete search history.

(56) References Cited

U.S. PATENT DOCUMENTS 8,228,835 B2 7/2012 Yuan et al.
11,856,578 B2 * 12/2023 Lee ...................... H04L 1/0606
(Continued)

FOREIGN PATENT DOCUMENTS

CN 1951070 A 4/2007
CN 101268660 A 9/2008
(Continued)

OTHER PUBLICATIONS

Non-final Office Action mailed on Jan. 30, 2024 from the Japanese Patent Office for Japanese Application No. 2022-189281 and its English translation.
(Continued)

*Primary Examiner* — Jamal Javaid

(57) ABSTRACT

The present invention relates to a method and an apparatus for transmitting control and training symbols to improve transmission efficiency in a multi-user wireless communication system. The method for transmitting the control and training symbols in the multi-user wireless communication system according to one embodiment of the present invention comprises the steps of: determining whether a required transmission rate of each data can be satisfied through channel estimation in each of terminals when different data are simultaneously transmitted to each of the terminals; and transmitting a data frame to each of the terminals, the data frame being composed to discriminate the control and
(Continued)

101 training symbols in each of the terminals using a combination of time, frequency, and code area when the required transmission rate of each data is not satisfied according to the determined result.

21 Claims, 15 Drawing Sheets

Related U.S. Application Data continuation of application No. 14/555,457, filed on Nov. 26, 2014, now Pat. No. 11,006,393, which is a continuation of application No. 13/458,993, filed on Apr. 27, 2012, now Pat. No. 8,923,261, which is a continuation of application No. PCT/KR2010/007574, filed on Oct. 30, 2010.

(51) Int. Cl.

| | | |
|---|---|---|
| *H04L 1/00* | (2006.01) | |
| *H04L 1/06* | (2006.01) | |
| *H04L 5/00* | (2006.01) | |
| *H04W 48/08* | (2009.01) | |
| *H04W 28/04* | (2009.01) | |
| *H04W 28/06* | (2009.01) | |
| *H04W 28/22* | (2009.01) | |
| *H04W 80/04* | (2009.01) | |
| *H04W 84/12* | (2009.01) | |

(52) U.S. Cl.

CPC .......... *H04L 1/0606* (2013.01); *H04L 1/0612* (2013.01); *H04L 5/0023* (2013.01); *H04L 5/0053* (2013.01); *H04L 5/0073* (2013.01); *H04W 48/08* (2013.01); *H04L 1/0072* (2013.01); *H04W 28/04* (2013.01); *H04W 28/06* (2013.01); *H04W 28/22* (2013.01); *H04W 80/04* (2013.01); *H04W 84/12* (2013.01)

(56) References Cited

U.S. PATENT DOCUMENTS

| | | | |
|---|---|---|---|
| 2006/0193340 A1 | 8/2006 | Jones et al. |
| 2007/0097911 A1 | 5/2007 | Ouyang et al. |
| 2007/0097930 A1 | 5/2007 | Ouyang et al. |
| 2008/0049654 A1 | 2/2008 | Otal et al. |
| 2008/0181323 A1 | 7/2008 | Waters et al. |
| 2008/0186890 A1 | 8/2008 | Shao et al. |
| 2009/0031185 A1 | 1/2009 | Xhafa et al. |
| 2010/0248635 A1 | 9/2010 | Zhang et al. |
| 2010/0260159 A1 | 10/2010 | Zhang et al. |
| 2011/0032875 A1 | 2/2011 | Erceg et al. |

FOREIGN PATENT DOCUMENTS

| | | | |
|---|---|---|---|
| CN | 101562476 A | 10/2009 |
| JP | 2007-537655 A | 12/2007 |
| JP | 2008-124832 A | 5/2008 |
| JP | 2008-530912 A | 8/2008 |
| JP | 2008-536302 A | 12/2008 |
| JP | 2009-033746 A | 2/2009 |
| JP | 2009-246978 A | 10/2009 |
| JP | 2013-504248 A | 2/2013 |
| JP | 2013-509106 A | 3/2013 |
| JP | 5380606 B | 1/2014 |
| JP | 2021-057912 A | 4/2021 |
| KR | 10-2009-0076966 A1 | 7/2009 |
| KR | 10-2009-0079480 A1 | 7/2009 |
| KR | 10-2009-0105299 A1 | 10/2009 |
| KR | 10-2009-0110114 A | 10/2009 |
| WO | 2005/112354 A1 | 11/2005 |
| WO | 2008/002972 A2 | 1/2008 |
| WO | 2009/109894 A1 | 9/2009 |
| WO | 2010021900 A2 | 2/2010 |
| WO | 2010/120692 A1 | 10/2010 |
| WO | 2011/019968 A1 | 2/2011 |
| WO | 2011/031058 A2 | 3/2011 |
| WO | 2011/050324 A1 | 4/2011 |

OTHER PUBLICATIONS

U.S. Appl. No. 17/314,067, Yu-Ro Lee et al., filed May 7, 2021, Pending.

U.S. Appl. No. 14/555,457, Yu-Ro Lee et al., filed Nov. 26, 2014, U.S. Pat. No. 11,006,393.

U.S. Appl. No. 13/458,993, Yu-Ro Lee et al., filed Apr. 27, 2012, U.S. Pat. No. 8,923,261.

Chinese office action mailed Feb. 2, 2021 for Chinese Application No. 201710929003.7 and its English translation.

3GPP, "IEEE Standard for Information Technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput", IEEE Std. 802.11n-2009, Oct. 29, 2009, 258-280, LEEE Computer Society.

Yong Liu et al., "VHT Frame Padding", IEEE 802.11-10/0064r1, Jan. 19, 2010, Slides 1-10.

Japanese office action mailed Jan. 21, 2022 for Japanese Application No. 2020-212744 and its English translation.

Sean Coffey et al., "Joint Proposal" High throughput extension to the 802.11 Standard: Phy, IEEE 802.11-05/1102r2, Nov. 17, 2005.

Begonya Otal et al., "Enhancements of 802.11a/g-based MIMO-OFDM System", IEEE 802.11-04/943r0, Aug. 13, 2004.

Robert Stacey et al., "IEEE P802.11 Wireless LANs Specification Framework for TGac", doc.: IEEE 802.11-09/0992r11, May 18, 2010, pp. 1-11.

Robert Stacey et al., "IEEE P802.11 Wireless LANs Specification Framework for TGac", doc.: IEEE 802.11-09/0992r12, Jul. 14, 2010, pp. 1-19.

International Search Report for PCT/KR2010/007574 filed on Oct. 30, 2010.

"Draft Standard for Information Technology Telecommunications and information exchange between system. Local and metropolitan area networks. Specific requirements. Part 11: Wireless LAN Medium Access Control (MAC) and Physical Layer (PHY) specifications: Amendment 5: Enhancement for Higher Throughput", IEEE P802. 11N/D9.0, Mar. 2009.

Office Action issued by the EPO on Oct. 7, 2013 for the corresponding EP Application No. 10827154.5.

* cited by examiner

FIG. 8E $$
\begin{array}{cccccc}
C_{11} & C_{12} & C_{13} & C_{14} & C_{15} & \cdots & C_{1n} \\
C_{21} & C_{22} & C_{23} & C_{24} & C_{25} & \cdots & C_{2n}
\end{array} \quad \text{STA 1}
$$

$$
\begin{array}{cccccc}
C_{31} & C_{32} & C_{33} & C_{34} & C_{35} & \cdots & C_{3n} \\
C_{41} & C_{42} & C_{43} & C_{44} & C_{45} & \cdots & C_{4n} \\
C_{51} & C_{52} & C_{53} & C_{54} & C_{55} & \cdots & C_{5n}
\end{array} \quad \text{STA 2}
$$

$$
\begin{array}{cccccc}
\vdots & \vdots & \vdots & \vdots & \vdots & \ddots & \vdots \\
C_{m1} & C_{m2} & C_{m3} & C_{m4} & C_{m5} & \cdots & C_{mn}
\end{array} \quad \text{STA K}
$$

FIG. 8F

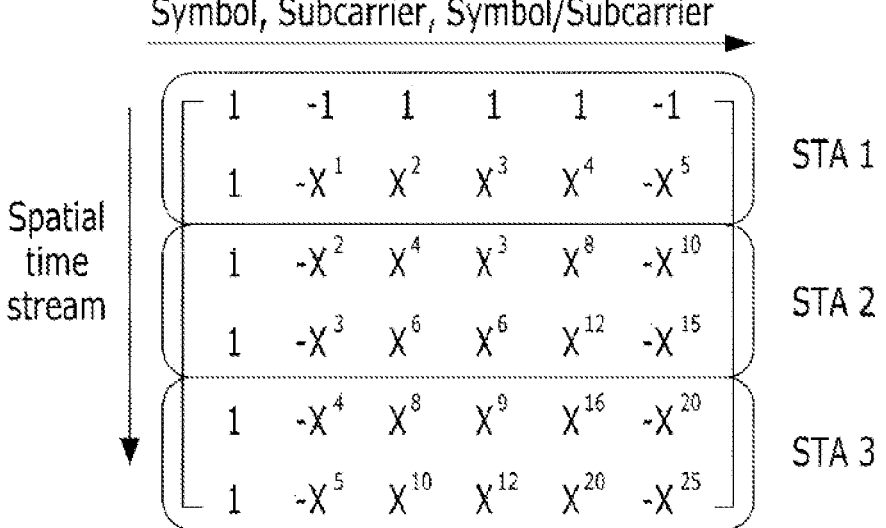

METHOD FOR TRANSMITTING CONTROL AND TRAINING SYMBOLS IN MULTI-USER WIRELESS COMMUNICATION SYSTEM

CROSS-REFERENCE TO RELATED APPLICATIONS

The present application is a continuation of U.S. application Ser. No. 17/314,067, filed on May 7, 2021, which is a continuation of U.S. application Ser. No. 14/555,457, filed Nov. 26, 2014 (now U.S. Pat. No. 11,006,393), which is a continuation of U.S. application Ser. No. 13/458,993, filed Apr. 27, 2012 (now U.S. Pat. No. 8,923,261), which is a continuation of International Patent Application No. PCT/KR2010/007574, filed Oct. 30, 2010, which claims priority to Korean Patent Application No. 10-2009-0104616, filed Oct. 30, 2009, and Korean Patent Application No. 10-2010-0013612, filed Feb. 12, 2010, the content of which are incorporated by reference in their entirety.

TECHNICAL FIELD

Exemplary embodiments of the present invention relate to a method and apparatus for transmitting control and training symbols in a multi-user wireless communication system, which can improve the transmission efficiency thereof.

BACKGROUND ART

Recently, transmission schemes for higher transmission rates in wireless communication systems are being researched and standardized. In order to have such a high transmission rate in wireless LAN systems as well, a structure having a transmission rate of a maximum of 600 Mbps has been standardized, to which a MIMO system having multiple input/output in IEEE 802.11 TGn has been applied. There has been discussion in IEEE 802.11 VHTSG regarding a system having a maximum transmission rate of 1 Gbps at MAC SAP, and the task group of IEEE 802.11 TGac/TGad has been established accordingly. In order to maintain frequency efficiency while satisfying such a high transmission rate, the AP and STA must support more streams than four, which are supported by TGn, requiring a large number of antennas. In STA's terms, it is difficult to support a large number of antennas, considering the complexity or power consumption of the STA. Therefore, multi-user MIMO is being considered, according to which the AP simultaneously transmits to multiple STAs.

FIG. 1 is a timing diagram for explaining the occurrence of interference between stations (STAs) which simultaneously transmit data in a case in which a transmission scheme such as TGn is maintained while supporting a multi-user MIMO.

As illustrated in FIG. 1, when different data are simultaneously transmitted to two or more STAs, different information transmitted to the respective STAs may be interfered in areas indicated by reference numeral 101.

In addition, the respective STAS has different signal to interference plus noise ratios (SINRs), depending on channel states or interference degrees of the STAs. However, in a currently considered frame structure, the number of LTFs is determined by the number of streams, and a MCS is determined by a minimum transfer rate of a signal field (SIG).

In the IEEE 802.11n, a mixed PPDU format provides a backward compatibility with the IEEE. 802.11a/g, and a green field format supports only the IEEE 802.11n. Each STA sets Network Allocation Vector ((NAV):(TXOP)) information by using length information and a modulation & coding scheme contained in a signal field of a frame.

However, in a case in which a multi-user MIMO is applied, each STA receives a beamformed frame, and thus, STAs may not correctly detect length information and MCS of the signal field. Consequently, a hidden node problem may become more serious.

Disclosure

Technical Problem

An embodiment of the present invention is directed to an apparatus and method for solving a hidden node problem in a wireless communication system using a multi-user MIMO.

Another embodiment of the present invention is directed to an apparatus and method for solving a hidden node problem in a green-field mode, in which VHT-SIG is divided into a common signal field, which can be received by all STAs, and a dedicated signal field, which includes beamformed STA information, and appropriate LTF and SIG structures are selected depending on channel states or interference degrees between STAs.

Technical Solution

In accordance with an embodiment of the present invention, a method for transmitting control and training symbols in a multi-user wireless communication system includes: determining whether or not a required transfer rate of each data is met in each station through a channel estimation, upon simultaneous transmission of different data to each station; and when the required transfer rate of each data is not met, configuring a data frame so that the control and training symbols are distinguished at each station by using the combination of time, frequency and code domains, and transmitting the data frame to each station.

In accordance with another embodiment of the present invention, a method for transmitting control and training symbols in a multi-user wireless communication system includes: determining whether or not a required transfer rate of each data is met in each station through a channel estimation, upon simultaneous transmission of different data to each station; and when the required transfer rate of each data is met, configuring a data frame so that the control and training symbols are overlapped without being distinguished at each station, and transmitting the data frame to each station.

Advantageous Effects

The embodiments of the present invention have the following effects.

First, the STAs having a poor channel state increase (repeat) the length of the LTF and applies a low MCS to the VHT-SIG-D or repeats the symbols of the VHT-SIG-D. In this way, the VHT-SIG-D detection performance can be improved.

Second, the STAs having a good channel state transmits the VHT-SIG-D as one or more streams and uses a high MCS to reduce the number of symbols occupied by the VHT-SIG-D, thereby increasing the transmission efficiency.

Third, the channel estimation performance can be improved by coordinating the LTF between the STAs.

Fourth, a hidden node problem caused by the beamforming in the green-field format can be avoided.

DESCRIPTION OF DRAWINGS

FIG. 2 is an exemplary diagram of a PPDU format in an IEEE 802.11a/g/nNHT mixed mode in a mode "a".

FIG. 3 is an exemplary diagram of a PPDU format in an IEEE 802.11nNHT mixed mode in a mode "a".

FIG. 5 is an exemplary diagram of a PPDU of a mixed mode format in a mode "b" for STAs coordinating an LTF.

FIG. 6 is an exemplary diagram of a PPDU of a green-field format in a mode "b" for STAs coordinating an LTF.

FIGS. 8A to 8H are exemplary diagrams of a spread matrix for explaining an LTF coordination process in accordance with an embodiment of the present invention.

BEST MODE

Figure 1:
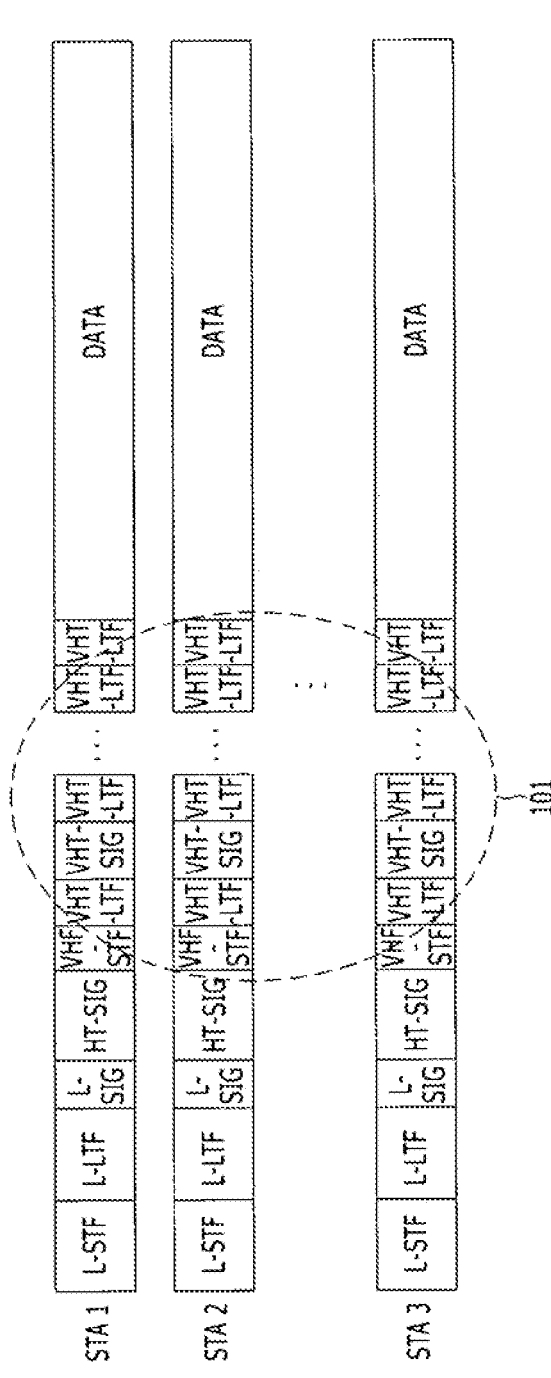
FIG. 1 is a timing diagram for explaining the occurrence of interference between stations (STAs) which simultaneously transmit data in a case in which a transmission scheme such as TGn is maintained while Supporting a multi-user MIMO.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

First, a multi-user MIMO transmission/reception signal can be expressed as shown:

$$y=HWp+n \qquad \text{[Equation 1]}$$

where y denotes a reception signal, H denotes a channel, W denotes a precoding matrix of transmitting end, p denotes a training sequence value and n denotes a noise.

If a ZF precoding scheme which nulls interference between STAs is used, there is no interference between STAs in the ideal environment. However, if an MMSE precoding scheme is applied, interference occurs between STAs.

When assuming that an AP transmits two streams and two STAs receive one stream, a transmission/reception signal of a training sequence in a multi-user MIMO is expressed as shown below.

$$y = HWp + n = \begin{bmatrix} h_{11} & h_{12} \\ h_{21} & h_{22} \end{bmatrix} \begin{bmatrix} w_{11} & w_{12} \\ w_{21} & w_{22} \end{bmatrix} \begin{bmatrix} p_1 \\ p_2 \end{bmatrix} + \begin{bmatrix} n_1 \\ n_2 \end{bmatrix} \qquad \text{[Equation 2]}$$

Channel estimations of STA 1 and STA 2 may be expressed as Equation 3 below.

$$\hat{h}_2=(h_{11}w_{12}+h_{12}w_{22})+(h_{21}w_{22}+h_{22}w_{21})p_1p_2^*+n_2p_2^* \qquad \text{[Equation 3]}$$

$$\hat{h}_1=(h_{11}w_{11}+h_{12}w_{21})+(h_{11}w_{12}+h_{12}w_{22})p_2p_1^*+n_1p_1^*$$

As in Equation 3 above, interference exists between the STAs, and such interference becomes serious with the correlation degree of channels. In order to such an error, a method of increasing length by repeating an LTF, a method of reducing an MCS of a SIG or increasing symbol length, or a method of coordinating an LTF and transmitting the coordinated LTF may be used. In addition, when a channel state is superior, a method of increasing an MCS and reducing an overhead may be used.

However, the above-described error reducing methods increase the overhead of the LTF occupied in the frame. Thus, in order to reduce such an overhead, a signal field indicating whether or not the LTF is repeated, the MCS of the SIG is reduced, and the LTF is coordinated is required. The coordination of the LTF is information which must be known by all STAs coordinating the LTF. Therefore, the information should be transmitted in such a way that all STAs can receive it, not a specific beamforming. Hence, a VHT-SIG is divided into a common control signal and a dedicated control signal.

In this embodiment, a field which transmits the common control signal of the VHT-SIG is defined as a VHT-SIG-C, and a field which transmits the dedicated control signal of the VHT-SIG is defined as a VHT-SIG-D. A mode for STAs which do not coordinate the LTF is defined as a mode "a", and a mode for STAs which coordinate the LTF is defined as a mode "b".

A mode in which the AP supports not the VHT STA but 11a/g/n STAs is defined as an 11a/g/n/yHT mixed mode, a mode which supports the IEEE 802.11n is defined as an 11n/VHT mixed mode, and a mode which does not support the IEEE 802.11a/g/n is defined as a green-field mode. The respective transmission frame format is called a PPDU format. Hereinafter, a transmitting method in each mode will be described.

A transmitting method in a mode "a" will be described below.

Figure 2:
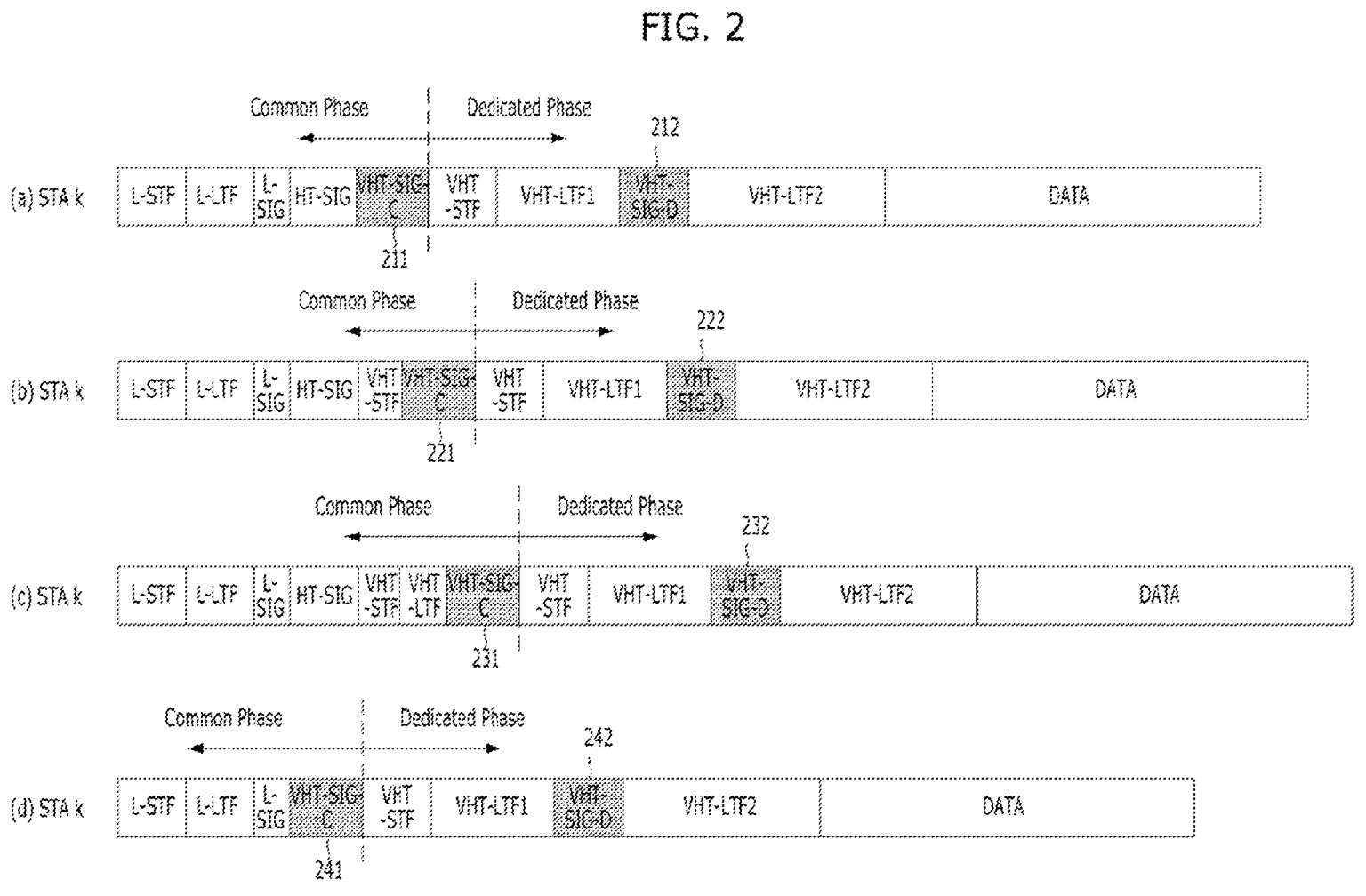
Figure 3:
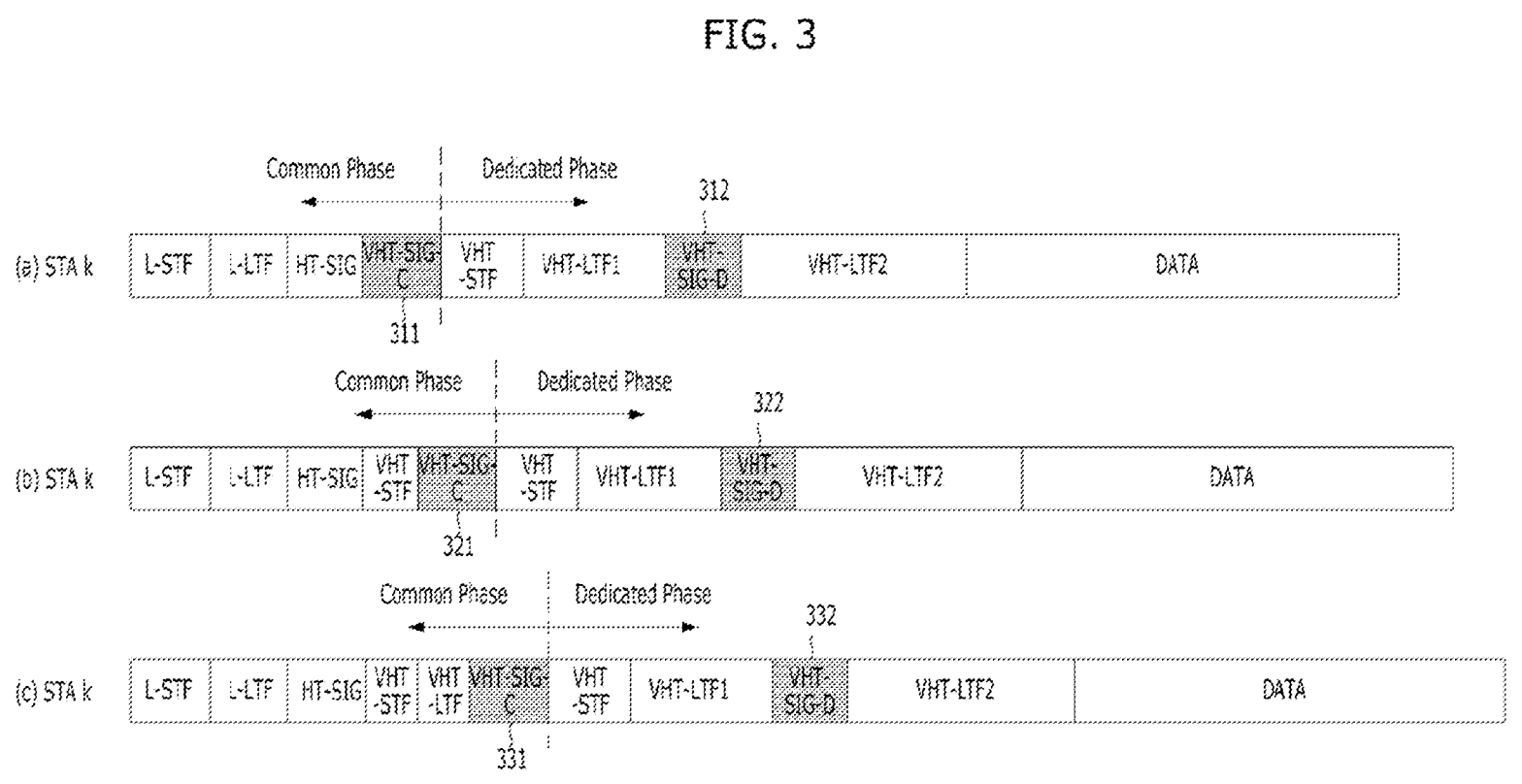

FIG. 2 is an exemplary diagram of a PPDU format in an IEEE 802.11a/g/nNHT mixed mode in a mode "a", and FIG. 3 is an exemplary diagram of a PPDU format in an IEEE 802.11n/VHT mixed mode in a mode "a".

In FIGS. 2 and 3, the PPDU format has a common phase and a dedicated phase. The common phase is defined as a phase till a VHT-SIG-C field, and the dedicated phase is defined as a phase after the VHT-SIG-C field.

In the case of FIGS. 2(*a*) and 3(*a*), VHT-SIG-C fields 211 and 311 are located after an HT-SIG field. In addition, in the case of FIGS. 2(*b*) and 3(*b*), VHT-SIG-C fields 221 and 321 are located after a VHT-STF field.

In FIGS. 2(*b*) and 3(*b*), when a VHT STA receives the IEEE 802.11n frame format, the STA does not know whether the frame is the IEEE 802.11n frame or the VHT frame, prior to detection of the VHT-SIG-C. Thus, considering that an HT-STF for automatic gain control (AGC) may be located at a symbol position of the VHT-SIG-C, the VHT-STF symbol may be transmitted after the HT-SIG, and then, the VHT-SIG-C may be transmitted.

In the case of FIGS. 2(*c*) and 3(*c*), VHT-SIG-C fields 231 and 331 are located after the VHT-LTF field. In FIGS. 2(*c*) and 3(*c*), when an AGC is performed through the VHT-STF, the VHT-LTF is transmitted after the VHT-STF in order for decoding performance of the VHT-SIG-C, and then, the VHT-SIG-C fields 231 and 331 are transmitted.

In FIG. 2(d), after an L-SIG, a VHT-SIG-C field 241 may be immediately transmitted, without HT-SIG. In addition, various PPDU formats may be provided.

In the cases of FIGS. 2(a) to 2(d) and FIGS. 3(a) to 3(c), all dedicated phases may have the VHT-SIG-D fields 212, 222, 232, 242, 312, 322 and 332.

Figure 4:
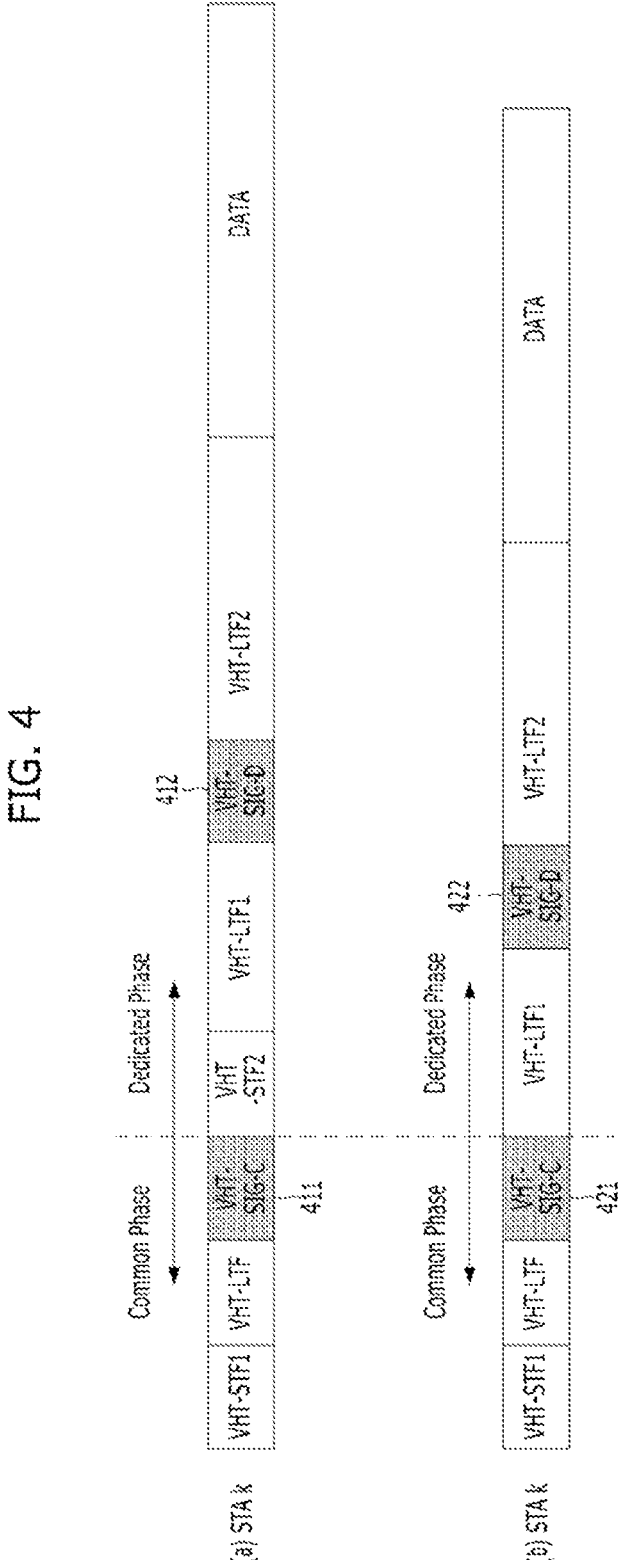
FIG. 4 is an exemplary diagram of a green-field PPDU format in accordance with an embodiment of the present invention.

FIG. 4 is an exemplary diagram of a green-field PPDU format in accordance with an embodiment of the present invention.

In the cases of FIGS. 4(a) and 4(b), the green-field PPDU format may be divided into a common phase and a dedicated phase. The dedicated phases start after the VHT-SIG-C fields 411 and 421. Therefore, in the dedicated phases, the VHT-SIG-D fields 412 and 422 are located in the dedicated phases.

More specifically, as illustrated in FIG. 4(a), information of VHT-STF2 and VHT-LTF1 fields and information of VHT-SIG-D and VHT-LTF2 fields are transmitted through the VHT-SIG-C field 411 all STAs can receive. As illustrated in FIG. 4(b), the VHT-LTF1 may be transmitted when the AGC is unnecessary after the VHT-SIG-C 421.

Figure 5:
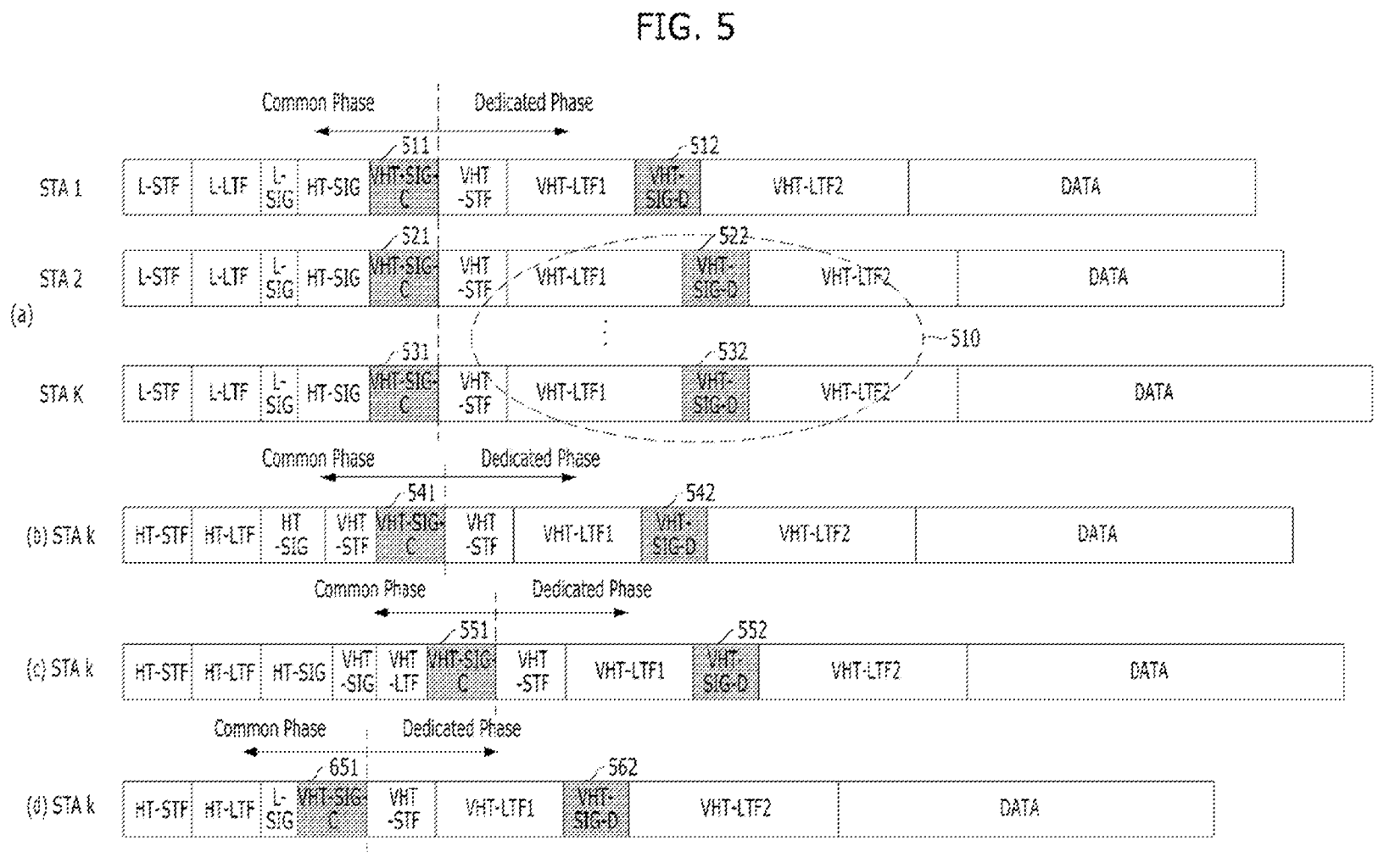
Figure 6:
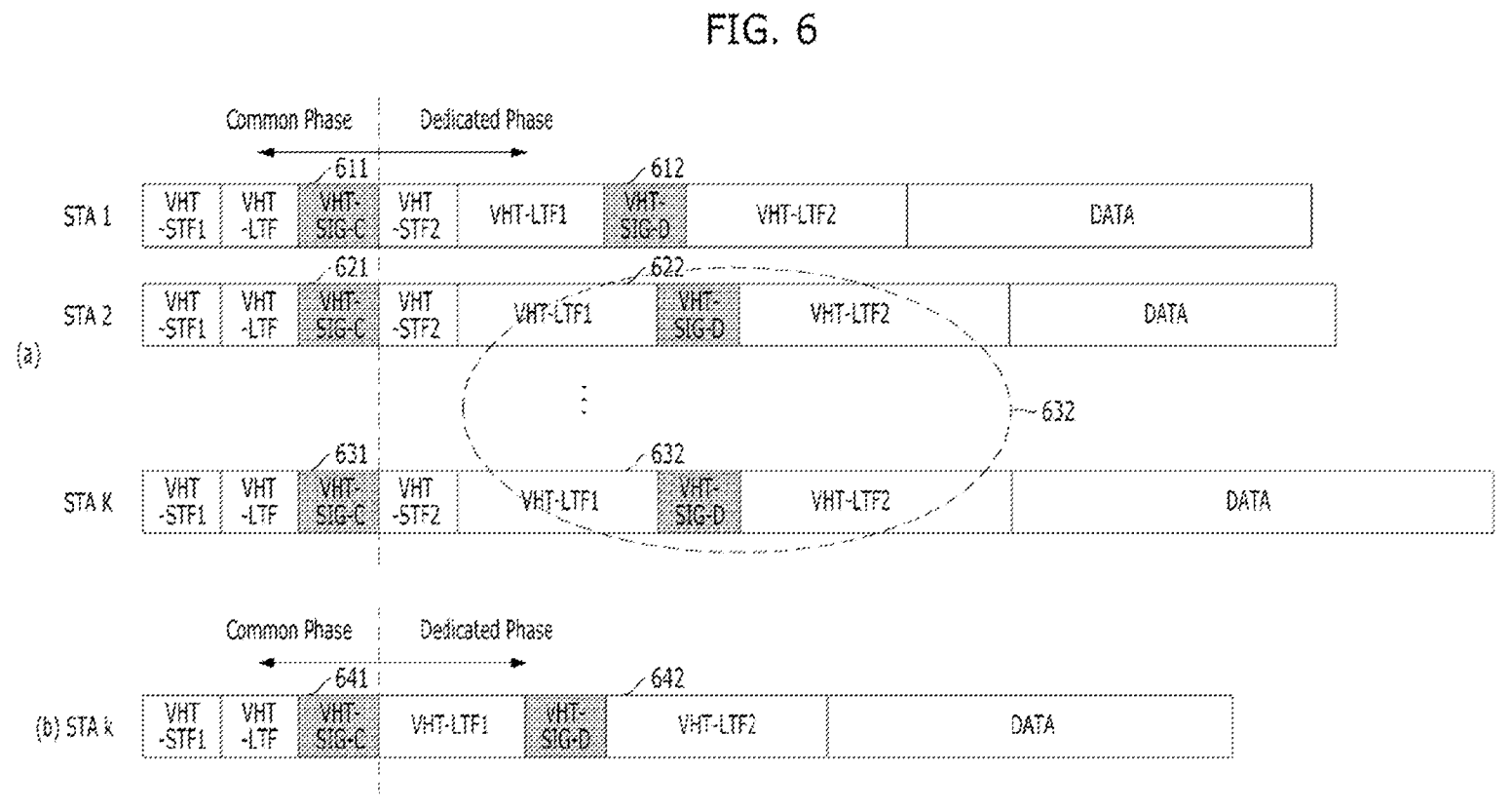

FIG. 5 is an exemplary diagram of a PPDU of a mixed mode format in a mode "b" for STAs coordinating an LTF, and FIG. 6 is an exemplary diagram of a PPDU of a green-field format in a mode "b" for STAs coordinating an LTF.

In FIGS. 5 and 6, VHT-SIG-C fields 511, 521, 531, 541, 551, 561, 611, 621, 631 and 641 divide the PPDU into the common phase and the dedicated phase. The dedicated phases include the VHT-SIG-D fields 512, 522, 532, 542, 552, 562, 621, 622, 532 and 642). A detailed description will be described below with reference to the accompanying drawings.

FIGS. 5(a), 5(b), 5(c) and 5(d) are identical to three cases of the mode "a" in FIG. 2. Coordination between the STAs may be performed by K STAS which simultaneously transmit data, or may be performed by necessary STAs, for example, the STAs a to b. FIG. 5(a) illustrates a case in which the STAS 2 to K are coordinated. That is, the VHT-SIG-D fields 522 and 532 may be located at arbitrary positions between the VHT-SIG-C and a data field, and the positions may be designated by the information of the VHT-SIG-C. The cases of FIGS. 5(b), 5(c) and 5(d) may coordinate the STAs in the same manner as FIG. 5(a).

A case of FIG. 6 will be described below. The cases of FIGS. 6(a) and 6(b) are identical to the three cases in the mode a of FIG. 3. Coordination between the STAs may be performed by K STAS which simultaneously transmit data, or may be performed by necessary STAs, for example, the STAs a to b. FIG. 6(a) illustrates a case in which the STAS 2 to K are coordinated. In addition, in the case of FIG. 6(b), STAs may be coordinated in the same manner as that of FIG. 6(a). At this time, the VHT-SIG-D fields 612, 622, 632 and 642 may be located at arbitrary positions between the VHT-SIG-C and a data field, and the positions may be designated by the information contained in the VHT-SIG-C of the corresponding frame.

A control message contained in a signal field will be exemplarily described below.

Information contained in the VHT-SIG1 (common control signal, VHT-SIG-C) in which all STAs receive the same information is as follows.

The VHT-SIG1 (VHT-SIG-C) contains the following information.

(1) Mode a: STA which does not perform LTF coordination

The following information is required in each STA.

a) Symbol number of VHT-LTF1, repetition or non-repetition b) Symbol number of VHT-LTF2 (it may be contained in VHT-SIG2 (VHT-SIG-D))

c) MCS of VHT-SIG2 (VHT-SIG-D)

d) Symbol number of VHT-SIG2 (VHT-SIG-D), Repetition or non-repetition (2) Mode b: STA which performs LTF coordination Index of STA which performs LTF coordination)

LTF coordination method

Symbol number of VHT-LTF1, Repetition or non-repetition

Symbol number of VHT-LTF2 (it may be contained in VHT-SIG2 (VHT-SIG-D))

MCS of VHT-SIG2 (VHT-SIG-D)

Symbol number of VHT-SIG2 (VHT-SIG-D), repetition or non-repetition (3) In the case of the green-field mode, a hidden node problem caused by beamforming is avoided, and the following information is additionally contained in order for the case of STA which does not use beamforming.

MCS, length information

Use or non-use of VHT-STF2

(4) The following information is contained in VHT-SIG2 (VHT-SIG-D) in which STAs receive different information.

Information for data area of STA, such as MCS, bandwidth (BW), length, aggregation, short guide interval (short GI)

The structure of VHT-LTF2 among information contained in VHT-SIG1 may be contained in VHT-SIG2.

LTF coordination methods may be provided depending on time-domain, frequency-domain, and code-domain coordination.

Mode b-1: Time-domain coordination

Mode b-2: Frequency-domain coordination

Mode b-3: Time-domain, code-domain coordination

Mode b-4: Code-domain, frequency-domain coordination

FIGS. 7A to 7D are exemplary diagrams for explaining an LTF coordination method in the cases of mode b-1, mode b-2, mode b-3, and mode b-4.

Figure 7A:
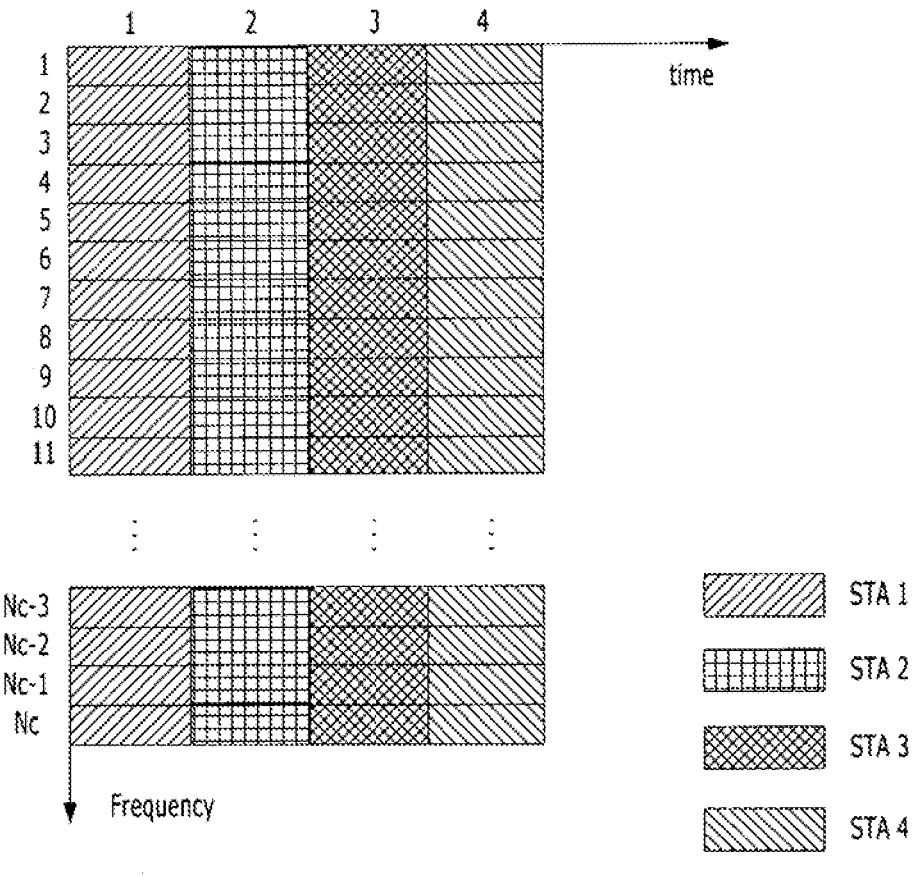
FIGS. 7A to 7D are exemplary diagrams for explaining a method for coordinating an LTF in a mode b-1, a mode b-1, a mode b-2, a mode b-3, and a mode b-4 in accordance with an embodiment of the present invention.
Figure 7B:
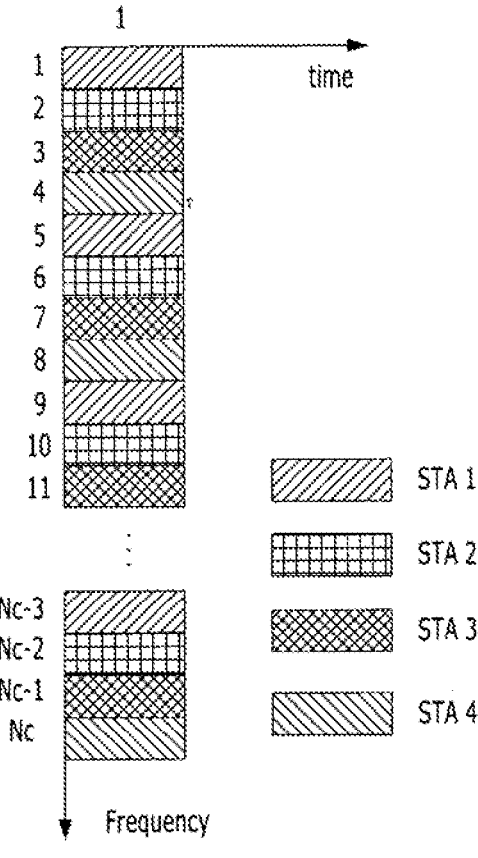
Figure 7C:
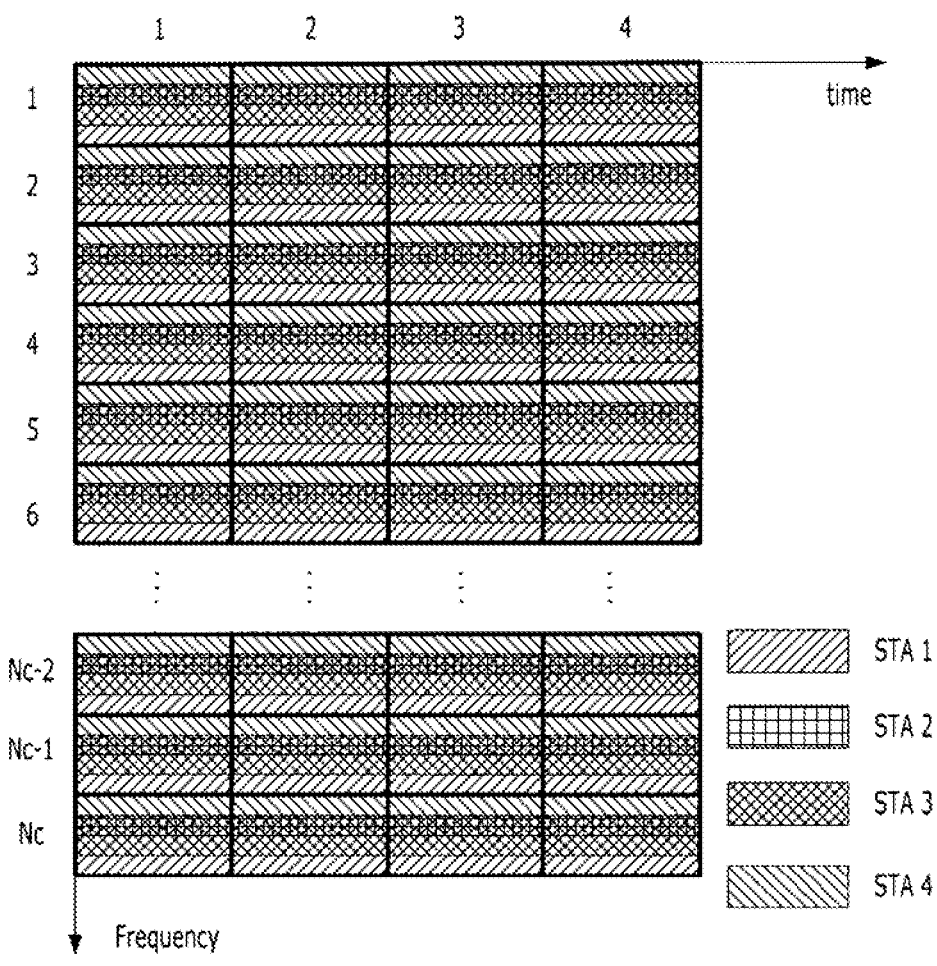
Figure 7D:
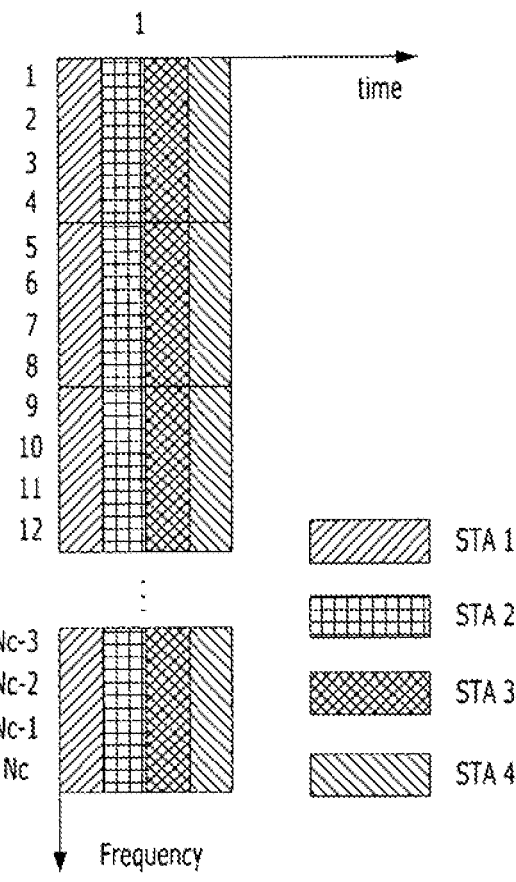

In FIGS. 7A to 7D, data are simultaneously transmitted to four STAs, and each STA receives one stream. FIG. 7A illustrates an example in which STAs are configured to transmit data in division by using different symbols which are time-domain values, and FIG. 7B illustrates an example in which STAs are configured to transmit data in division by using different subcarriers which are frequency-domain values. FIG. 7C illustrates an example in which STAs transmit data in division by using symbols, which are time- and frequency-domain values, and different codes in each STAs as symbol axes, and FIG. 7D illustrates an example in which STAs transmit data in division by using subcarriers, which are frequency- and code-domain values, and different codes in each STAs as subcarrier axes.

In FIGS. 7A to 7D, in the cases in which the respective STAs receive n streams, LTF corresponding to each STA is expanded to n LTFs, and they are coordinated in each STA. Thus, the configuration can be easily derived from one stream. Except for the combination of the mode b-1 to the mode b-4, a new LTF coordination method can be configured from combinations of these modes, and such a configuration can be easily derived from the existing modes.

In the case of LTF coordination, a transmission signal S can be expressed as shown:

$$
\begin{bmatrix} S_{11} & S_{12} & \dots & S_{1n} \\ S_{21} & S_{22} & \dots & S_{2n} \\ \vdots & \vdots & \ddots & \vdots \\ S_{m1} & S_{m2} & \dots & S_{mn} \end{bmatrix} =
$$

[Equation 4]

$$
\begin{bmatrix} W_{11} & W_{12} & \dots & W_{1m} \\ W_{21} & W_{22} & \dots & W_{2m} \\ \vdots & \vdots & \ddots & \vdots \\ W_{g1} & W_{g2} & \dots & W_{gm} \end{bmatrix} \begin{bmatrix} C_{11} & C_{12} & \dots & C_{1n} \\ C_{21} & C_{22} & \dots & C_{2n} \\ \vdots & \vdots & \ddots & \vdots \\ C_{m1} & C_{m2} & \dots & C_{mn} \end{bmatrix}
$$

$$
\begin{bmatrix} p_1 & 0 & \dots & 0 \\ 0 & p_2 & \dots & 0 \\ \vdots & \vdots & \ddots & \vdots \\ 0 & 0 & \dots & p_n \end{bmatrix}
$$

where p is an LTF sequence, and n is a symbol index corresponding to symbol area. C is a code which spreads into time or frequency or time/code or time/frequency domain, constituting a spread matrix. As the spread matrix, an orthogonal matrix, a discrete Fourier transform (DFT) matrix, and a unitary matrix may be used. m is an spatial time stream index corresponding to a spatial domain, and is equal to a total sum of the number of spatial time streams when STAs intending to simultaneously transmit data to MU-MIMO are coordinated. w is a precoding matrix for transmission of MU-MIMO, and g is a TX antenna index.

The case of OFDM can expand to a subcarrier which is the unit of the frequency domain, and a subcarrier index is skipped in Equation 4 above.

For example, when the mode is spread to the time domain like in the mode b-1 and the time-domain unit is a symbol, only the diagonal elements of the spread matrix has values, off-diagonal elements are zero. This is illustrated in FIG. 8A.

Figure 8A:
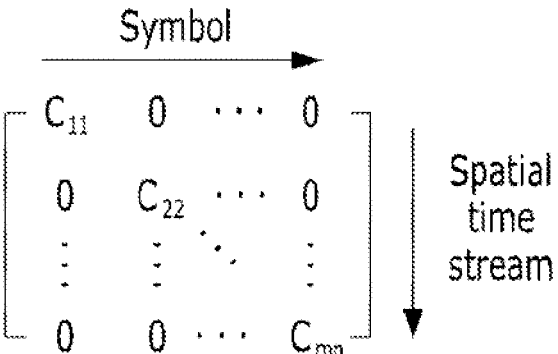

FIG. 8A is an exemplary diagram of a spread matrix when the mode b-1 is spread to the time domain and the time-domain unit is a symbol. In FIG. 8A, a horizontal axis is a symbol, and a vertical axis is a spatial time stream.

In addition, for example, when the mode is spread to the frequency domain like the mode b-2 and the frequency-domain unit is a subcarrier, only the diagonal elements of the spread matrix have values, like the expansion of the time domain. This is illustrated in FIG. 8B.

Figure 8B:
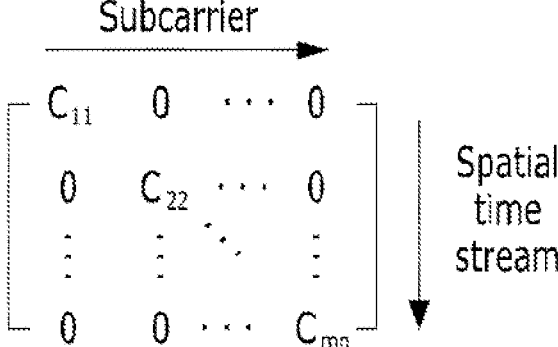

FIG. 8B is an exemplary diagram of a spread matrix when the mode b-2 is spread to the frequency domain and the frequency-domain unit is the subcarrier. In FIG. 8B, a horizontal axis is a subcarrier, and the vertical axis is a spatial time stream.

Figure 8C:
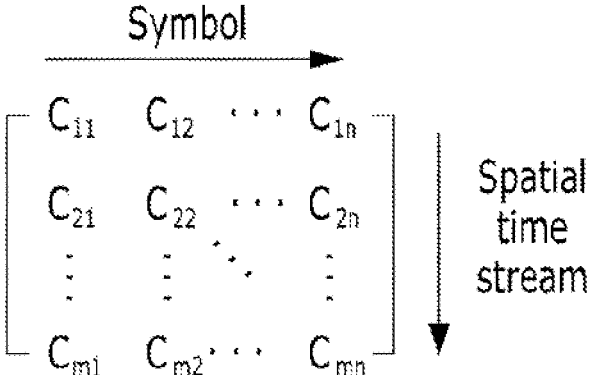

In addition, for example, the spread matrix may be illustrated like in FIG. 8C, when the mode is spread to the time and code domains like the mode b-3 and the time-domain unit is a symbol.

FIG. 8C is an exemplary diagram of a spread matrix when the mode b-3 is spread to the time and code domains and the time-domain unit is a symbol. In FIG. 8C, a horizontal axis is a symbol, and a vertical axis is a spatial time stream.

Figure 8D:
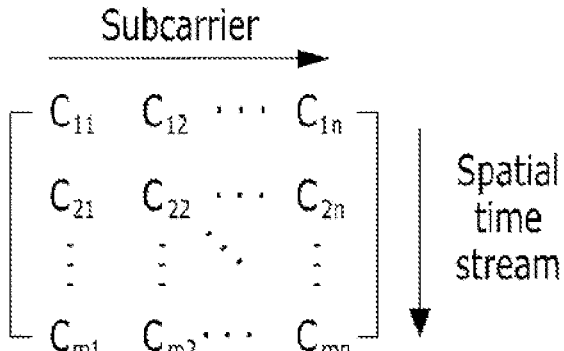

In addition, for example, when the mode is spread to the frequency and code domains like the mode b-4 and the frequency-domain unit is a subcarrier, the spread matrix may be illustrated like FIG. 8D.

FIG. 8D is an exemplary diagram of a spread matrix when the mode b-4 is spread to the frequency and code domains and the frequency-domain unit is a subcarrier. In FIG. 8D, a horizontal axis is a subcarrier, and a vertical axis is a spatial time stream.

By combining the above-described schemes, the spread matrix can be configured by easily expanding in the symbol/ subcarrier form in which the symbol and the subcarrier are combined. When assumed that the total spatial time stream to be transmitted is allocated in each STA, it may be exemplified like FIG. 8E.

FIG. 8E is an exemplary diagram when the total spatial time stream to be transmitted is allocated in each STA.

Referring to FIG. 8E, STA 1 uses two spatial time streams, STA 2 uses three spatial time streams, and STA K uses one spatial time stream. As illustrated in FIG. 8E, all STAs need not use the same number of the spatial time streams.

For example, when the total six spatial streams are used by three STAs, that is, each STAs uses two spatial time streams, and the spread matrix uses a DFT matrix, the allocation of the spread matrix in each STA may be illustrated like FIG. 8F.

In FIG. 8F, a horizontal axis is a spatial time stream, and a vertical axis is a symbol, a subcarrier, or a symbol/subcarrier. In the spread matrix of FIG. 8F, the values of the first row and the first column are 1. In addition, it should be noted that they have a value of $x=\exp(-j2\pi/6)$.

Figure 8G:
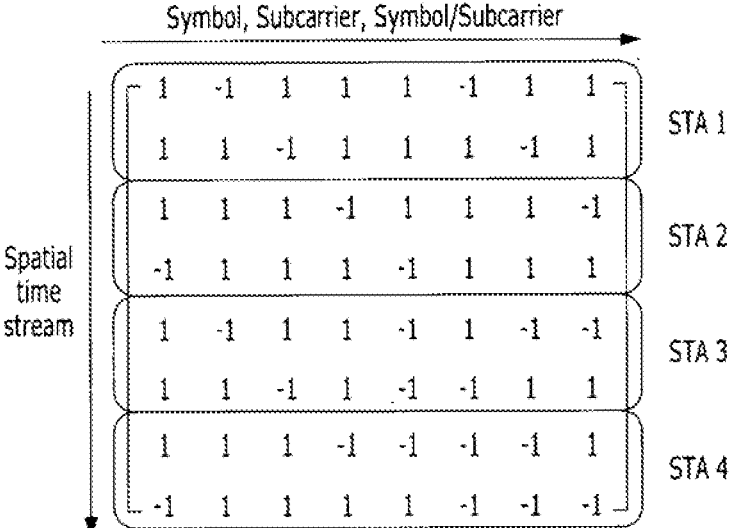

In addition, for example, when the total eight spatial streams are used by four STAs, that is, each STAs uses two spatial time streams, and a unitary matrix having real values is used as the spread matrix, the allocation of the spread matrix in each STA may be illustrated like FIG. 8G.

In FIG. 8G, a horizontal axis is a spatial time stream, and a vertical axis is a symbol, a subcarrier, or a symbol/subcarrier. As illustrated in FIG. 8G, each element value of the spread matrix may have an arbitrary value. As described above, the spread matrix may be a DFT matrix or a unitary matrix.

Figure 8H:
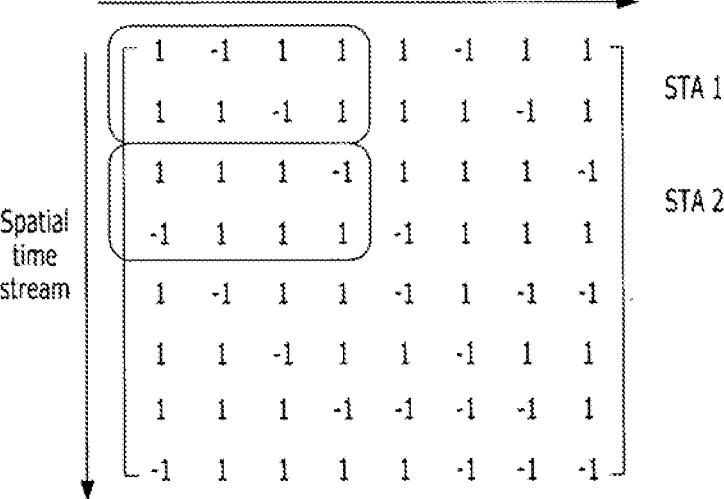

When the number of the spatial time streams to be simultaneously transmitted to the MU-MIMO is four and two STAs transmit two spatial time streams, respectively, the symbols required in the time domain is four. Thus, the calculation of the spread matrix can be performed as in FIG. 8H by applying 4×4 partial matrix which is a part of 8×8 matrix.

Figure 9:
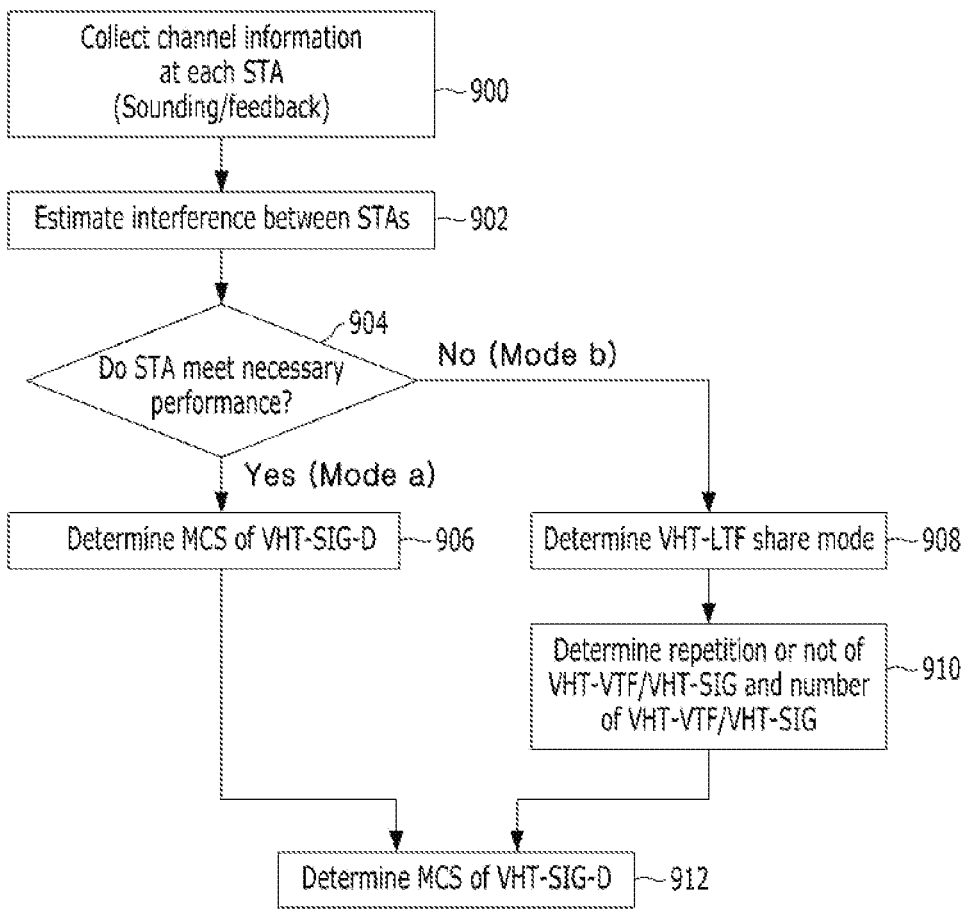
FIG. 9 is a flowchart for determining a PPDU format in accordance with a preferred embodiment of the present invention.

FIG. 9 is a flowchart for determining a PPDU format in accordance with a preferred embodiment of the present invention.

At step 900, the AP collects channel information of each STA through sounding or feedback information. At step 902, interference between the STAs is estimated from the channel information collected at step 900 by applying a precoding algorithm, such as ZF, MMSE, Sphere encoder, and so on.

At step 904, after the interference estimation, the AP determines whether or not the STAs meet necessary performance. This step is done for distinguish STAs which do not meet the required performance because a channel estimation error is increased by an increased interference between the STAs. That is, the STAs which do not meet the required performance perform an LTF coordination, and the STAs which meet the required performance do not perform an LTF coordination.

When the determination result of step 904 is met, that is, when the VHT-LTF coordination is not performed, the AP operates in a mode "a". In this case, the AP proceeds to step 906 to determine MCS of VHT-SIG-D by using the estimated SINR of the STA. When the estimated SINR is high, higher MCS is applied to the VHT-SIG-D, instead of BPSK. When the estimated SINR is low, the lowest MCS is transmitted.

On the other hand, when the determination result of step 904 is not met, that is, when the VHT-LTF coordination is performed, the AP operates in a mode "b". In this case, the AP proceeds to step 908 to select an appropriate coordination mode by using mobility, delay spread, SINR information of STAs which are coordinated by the AP.

For example, the AP applies the mode b-3 when the delay spread is large and applies the mode b-4 when the delay spread is small. When the SINR is low and the delay spread is large, the AP reduces the number of the simultaneous transmission users and applies the mode b-3 to obtain a gain by a dispreading.

The AP proceeds to step 910 to determine whether or not the VHT-LTF/VHT-SIG is repeated, and determine the number of repetition of the VHT-LTF/VHT-SIG. That is, when the AP coordinates the LTF, it can repeat the LTF in order to further improve the channel estimation performance. Thus, the number of repetition of the VHT-LTF/VHT-SIG is determined. In addition, the AP can increase the detection probability of the dedicated control signal by repeating the VHT-SIG-D.

As described above, when the mode and repetition for transmission are determined at steps 906 and 910, the AP proceeds to step 912 to determine a PPDU format, and configures the PPDU and transmits the configured PPDU.

In the mode a described above with reference to FIG. 2, the receiving end operates as follows in the 11a/g/nNHT mixed mode.

First, the case of FIG. 2(*a*) will be described below.

1) The receiving end performs a carrier sensing, an AGC, a timing synchronization, and a coarse frequency offset estimation through an L-STF.

2) Then, the receiving end performs a fine frequency offset estimation and a channel estimation through an L-LTF.

3) Then, the receiving end decodes an L-SIG by using the channel estimation value obtained using the L-LTF.

4) Then, the receiving end detects an HT-SIG using an HT-SIG detection method (BPSK phase rotation), and decodes it using the channel estimation value of the L-LTF.

5) After the above procedures, the receiving end detects a VHT-SIG-C using a VHT-SIG-C detection method (BPSK phase rotation), and decodes it using the channel estimation value of the L-LTF.

6) The receiving end performs the AGC on the beam-formed multi-user MIMO signal using the VHT-STF.

7) Then, the receiving end estimates the multi-user MIMO channel through the VHT-LTF by using information on the VHT-LTF structure of the VHT-SIG-C.

8) Then, the receiving end decodes the VHT-SIG-D from the information on the VHT-SIG-D indicated by the VHT-SIG-C and the channel estimation value using the VHT-LTF.

9) The receiving end decodes data using the information on the VHT-SIG-D data.

Next, the case of FIG. 2(*b*) will be described below. In the case of FIG. 2(*b*), the steps 1) to 4) are identical to those of the case of FIG. 2(*a*). Thus, only the subsequent steps will be described.

5) After the decoding of the L-SIG, the receiving end performs an AGC by using VHT-STF.

6) Then, the receiving end detects a VHT-SIG-C using a VHT-SIG-C detection method (BPSK phase rotation), and decodes it using the channel estimation value of the L-LTF.

7) Then, the receiving end performs an AGC on the beamformed multi-user MIMO signal using the VHT-STF.

8) The receiving end estimates the multi-user MIMO channel through the VHT-LTF by using information on the VHT-LTF structure of the VHT-SIG-C.

9) Then, the receiving end decodes the VHT-SIG-D from the information on the VHT-SIG-D indicated by the VHT-SIG-C and the channel estimation value using the VHT-LTF.

10) The receiving end decodes data using the information on the VHT-SIG-D data.

Next, the case of FIG. 2(*c*) will be described below. In the case of FIG. 2(*c*), the steps 1) to 4) are identical to those of the case of FIG. 2(*a*). Thus, only the subsequent steps will be described.

5) After the decoding of the L-SIG, the receiving end performs an AGC by using VHT-STF.

6) Then, the receiving end performs a channel estimation using the VHT-LTF.

7) The receiving end detects a VHT-SIG-C using a VHT-SIG-C detection method (BPSK phase rotation), and decodes it using the channel estimation value of the L-LTF.

8) Then, the receiving end performs an AGC on the beamformed multi-user MIMO signal using the VHT-STF.

9) Then, the receiving end estimates the multi-user MIMO channel through the VHT-LTF by using information on the VHT-LTF structure of the VHT-SIG-C.

10) Then, the receiving end decodes the VHT-SIG-D from the information on the VHT-SIG-D indicated by the VHT-SIG-C and the channel estimation value using the VHT-LTF.

11) The receiving end decodes data using the information on the VHT-SIG-D data.

Next, the case of FIG. 2(*d*) will be described below. In the case of FIG. 2(*d*), the steps 1) to 3) are identical to those of the case of FIG. 2(*a*). Thus, only the subsequent steps will be described.

4) After the decoding of the L-SIG, the receiving end detects a VHT-SIG-C using a VHT-SIG-C detection method (BPSK phase rotation), and decodes it using the channel estimation value of the L-LTF.

5) Then, the receiving end performs an AGC on the beamformed multi-user MIMO signal using the VHT-STF.

6) Then, the receiving end estimates the multi-user MIMO channel through the VHT-LTF by using information on the VHT-LTF structure of the VHT-SIG-C.

7) Then, the receiving end decodes the VHT-SIG-D from the information on the VHT-SIG-D indicated by the VHT-SIG-C and the channel estimation value using the VHT-LTF.

8) The receiving end decodes data using the information on the VHT-SIG-D data.

As described above, the receiving method in 11nNHT mixed mode/VHT green-field mode in the mode a and the mixed mode and the green-field mode in the mode b can be easily configured from the above operation structures.

INDUSTRIAL APPLICABILITY

The embodiments of the present invention can be applied to the cases of transmitting a training symbol in a high-rate wireless communication system.

What is claimed is:

1. A wireless communication method comprising:
receiving a first short training field;
receiving a first long training field;
receiving a first signal field;
receiving a second signal field;
receiving a third signal field using first information in of the second signal field, the first information in the second signal field indicating a modulation and coding scheme of the third signal field;
receiving a second long training field; and
receiving a data field.

2. The method of claim 1, wherein the first signal field is a legacy signal field, and the second signal field is a non-legacy signal field.

3. The method of claim 2, wherein the first short training field and the first long training field are legacy training fields, and the second long training field is a non-legacy training field.

4. The method of claim 1, wherein the first short training field, the first long training field, the first signal field, the second signal field, the third signal field, the second long training field, and the data field are received in that order.

5. The method of claim 1, wherein the second signal field further comprises second information indicating a number of symbols of the third signal field.

6. The method of claim 1, wherein the second signal field further comprises third information indicating a number of symbols of the second long training field.

7. A communication device of a station, the device comprising:
a circuitry, wherein the circuitry is configured to:
cause the station to receive a first short training field;
cause the station to receive a first long training field;
cause the station to receive a first signal field;
cause the station to receive a second signal field;
cause the station to receive a third signal field using first information in the second signal field, the first information in the second signal field indicating a modulation and coding scheme of the third signal field;
cause the station to receive a second long training field; and
cause the station to receive a data field.

8. The communication device of claim 7, wherein the first signal field is a legacy signal field, and the second signal field is a non-legacy signal field.

9. The communication device of claim 8, wherein the first short training field and the first long training field are legacy training fields, and the second long training field is a non-legacy training field.

10. The communication device of claim 7, wherein the first short training field, the first long training field, the first signal field, the second signal field, the third signal field, the second long training field, and the data field are received in that order.

11. The communication device of claim 7, wherein the second signal field further comprises second information indicating a number of symbols the third signal field.

12. The communication device of claim 7, wherein the second signal field further comprises third information indicating a number of symbols the second long training field.

13. A communication apparatus, comprising:
a circuitry, wherein the circuitry is configured to:
cause the communication apparatus to receive a first short training field;
cause the communication apparatus to receive a first long training field;
cause the communication apparatus to receive a first signal field;
cause the communication apparatus to receive a second signal field;
cause the communication apparatus to receive a third signal field using first information in the second signal field, the first information in the second signal field indicating a modulation and coding scheme of the third signal field;
cause the communication apparatus to receive a second long training field; and
cause the communication apparatus to receive a data field.

14. The communication apparatus of claim 13, wherein the first signal field is a legacy signal field, and the second signal field is a non-legacy signal field.

15. The communication apparatus of claim 14, wherein the first short training field and the first long training field are legacy training fields, and the second long training field is a non-legacy training field.

16. The communication apparatus of claim 13, wherein the first short training field, the first long training field, the first signal field, the second signal field, the third signal field, the second long training field, and the data field are received in that order.

17. The communication apparatus of claim 13, wherein the second signal field further comprises a second information indicating a number of symbols the third signal field.

18. The communication apparatus of claim 13, wherein the second signal field further comprises third information indicating a number of symbols the second long training field.

19. The method of claim 1, wherein the modulation and coding scheme is used to demodulate the third signal field.

20. The communication device of claim 7, wherein the modulation and coding scheme is used to demodulate the third signal field.

21. The communication apparatus of claim 13, wherein the modulation and coding scheme is used to demodulate the third signal field.

* * * * *